US012311434B2

(12) United States Patent
Tetkoskie et al.

(10) Patent No.: US 12,311,434 B2
(45) Date of Patent: May 27, 2025

(54) SENSOR CONTROLLED LAUNDER FLOW

(71) Applicant: PYROTEK, INC, Spokane, WA (US)

(72) Inventors: Jason Tetkoskie, Aurora, OH (US); Andrew Horsfall, Aurora, OH (US)

(73) Assignee: Pyrotek, Inc., Spokane, WA (US)

( * ) Notice: Subject to any disclaimer, the term of this patent is extended or adjusted under 35 U.S.C. 154(b) by 0 days.

(21) Appl. No.: 17/769,534

(22) PCT Filed: Oct. 15, 2020

(86) PCT No.: PCT/US2020/055756
§ 371 (c)(1),
(2) Date: Apr. 15, 2022

(87) PCT Pub. No.: WO2021/076743
PCT Pub. Date: Apr. 22, 2021

(65) Prior Publication Data

US 2024/0131577 A1 Apr. 25, 2024
US 2024/0226995 A9 Jul. 11, 2024

Related U.S. Application Data

(60) Provisional application No. 62/916,502, filed on Oct. 17, 2019.

(51) Int. Cl.
*B22D 2/00* (2006.01)
*B22D 17/30* (2006.01)
(Continued)

(52) U.S. Cl.
CPC ............ *B22D 2/003* (2013.01); *B22D 17/30* (2013.01); *B22D 35/04* (2013.01); *B22D 37/00* (2013.01); *F27D 3/14* (2013.01)

(58) Field of Classification Search
CPC ........ B22D 2/003; B22D 17/30; B22D 35/04; B22D 37/00
See application file for complete search history.

(56) References Cited

U.S. PATENT DOCUMENTS 3,738,778 A 6/1973 Starck et al.
5,465,777 A * 11/1995 Brunner ................ B22D 37/00 164/136

(Continued)

FOREIGN PATENT DOCUMENTS

EP 3372326 A1 9/2018
JP S56114557 A 9/1981

(Continued)

OTHER PUBLICATIONS

English machine translation of JP S63119965 A (Year: 1988).*

(Continued)

*Primary Examiner* — Kevin P Kerns
*Assistant Examiner* — Steven S Ha
(74) *Attorney, Agent, or Firm* — Lippes Mathias LLP

(57) ABSTRACT

According to a first embodiment, a molten metal transferring system is provided. The system includes a device capable of lifting molten metal from a bath to a launder at varying quantity per unit of time. The system includes a sensor, such as a laser, arranged to monitor molten metal flow in the launder. The launder further includes a removeable insert facilitating, reversible modification of a cross-sectional area of the launder.

13 Claims, 2 Drawing Sheets

(51) Int. Cl.

| | |
|---|---|
| ***B22D 35/04*** | (2006.01) |
| ***B22D 37/00*** | (2006.01) |
| ***F27D 3/14*** | (2006.01) |

(56) References Cited

U.S. PATENT DOCUMENTS

| | | | |
|---|---|---|---|
| 8,337,746 | B2 | 12/2012 | Cooper |
| 10,415,884 | B2 | 9/2019 | Schlicht et al. |
| 2008/0314548 | A1 | 12/2008 | Cooper |
| 2016/0138868 | A1 | 5/2016 | Bosworth et al. |

FOREIGN PATENT DOCUMENTS

| | | | | |
|---|---|---|---|---|
| JP | 63119965 | A | * | 5/1988 |
| JP | 09262644 | A | | 10/1997 |
| JP | 2005088070 | A | | 4/2005 |
| JP | 2008161894 | A | | 7/2008 |

OTHER PUBLICATIONS

International Search Report for Application No. PCT/US2020/055756, Mailed Jan. 29, 2021, 7 pages.

Written Opinion of the International Searching Authority for PCT/US2020/055756, Mailed Jan. 29, 2021, 6 pages.

Supplementary European Search Report for EP 20876681.6, dated Sep. 22, 2023, 69 pages.

* cited by examiner

FIGURE 1A - Prior Art
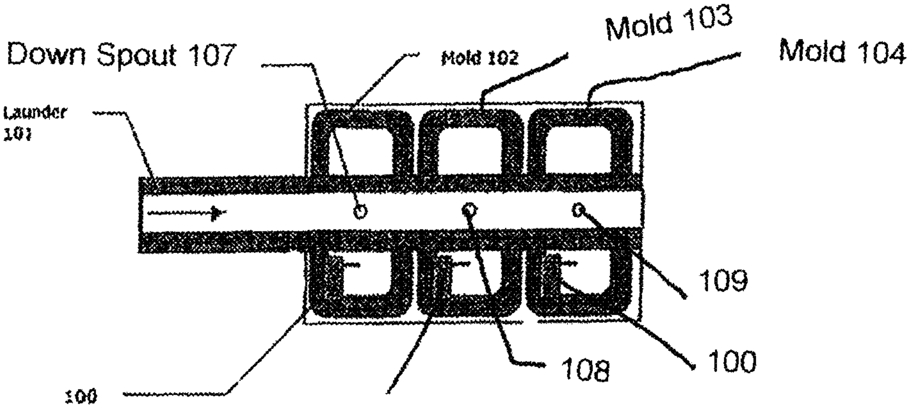
FIGURE 1B - PRIOR ART
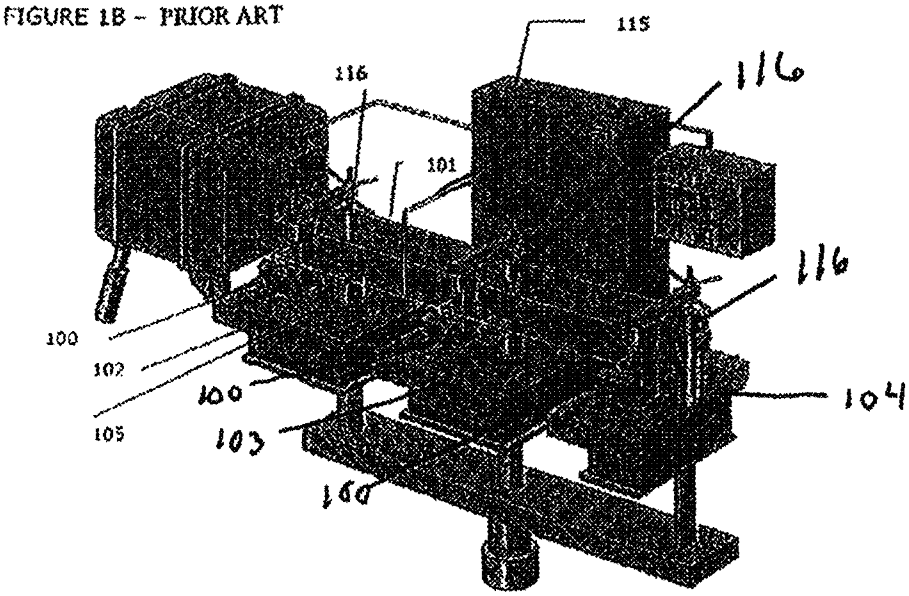
Figure 3
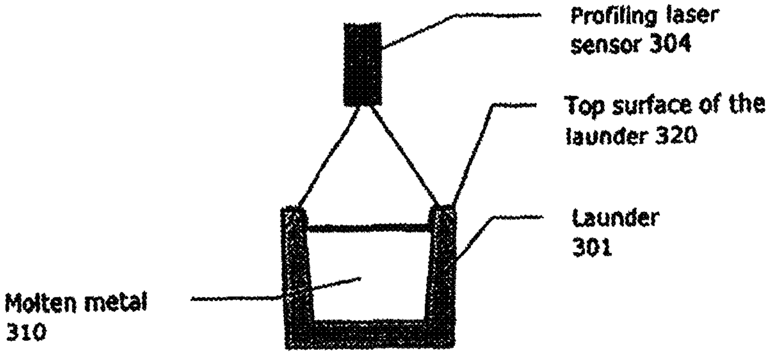

SENSOR CONTROLLED LAUNDER FLOW

This application claims the benefit of U.S. Provisional Application No. 62/916,502 filed Oct. 17, 2019, the disclosure of which is herein incorporated by reference.

BACKGROUND

The present exemplary embodiment relates to a molten metal pumping system. Pumps for pumping molten metal are used in furnaces in the production of metal articles. Common functions of pumps are circulation of molten metal in the furnace or transfer of molten metal to remote locations. The present description is focused on molten metal pumps for transferring metal from one location to another. It finds particular relevance to systems where molten metal is elevated from a furnace bath into a launder system.

Currently, many metal die casting facilities employ a main hearth containing the majority of the molten metal. Solid bars of metal may be periodically melted in the main hearth. A transfer pump can be located in a well adjacent the main hearth. The transfer pump draws molten metal from the well and transfers it into a conduit (in many instances a launder), and from there, to a ladel, a mold or a die casting machine that forms metal articles.

The present disclosure relates to pumps used to transfer molten metal from a furnace to a die casting machine, ingot mold, ladel or the like. The present disclosure can employ, for example, the types of pumping systems described in U.S. Pat. Nos. 10,415,884; 10,072,891; 9,909,808; 9,982,945; and 10,352,620, the disclosures of which are herein incorporated by reference.

Typically, a launder is used to transfer the molten from the furnace via the pumping system to a casting location. The launder is essentially a trough, channel or conduit outside of the reverbatory furnace. A launder may be used to pass molten metal from the furnace and into a ladle and/or into molds. The launder may be of any dimension or shape. For example, it may be one foot in length or as long as 100 feet. The launder is usually gently sloped, for example, it may be sloped downward or upward. In use, a typical launder includes molten aluminum at a depth of approximately 1-10".

When feeding a launder utilizing a transfer pump, the pump is turned off/on and accelerated according to when more molten metal is needed. This can be done automatically. If done automatically, the pump may turn on and/or accelerate when the molten metal in the launder is below a certain desired amount. In certain instances, a laser is employed for this purpose.

However, it has been determined that at low molten metal levels within a launder (e.g. less than 2"), the accuracy of laser readings becomes problematic. Since a common launder is often used interchangeably to fill large moldings (e.g. billets) and small castings (e.g. ingots), the launder will be used interchangeably to transfer either a large quantity or a small quantity of molten metal. A launder that is configured to transport a large quantity of metal inherently has a low level of molten metal when transporting a small quantity of molten metal. This leads to inaccuracy in the laser reading being used for automatic pump control. The present disclosure is directed to a solution for this problem.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a molten metal transferring system is provided. The system includes a device capable of lifting molten metal from a bath to a launder at varying quantity per unit of time. The system includes a sensor, such as a laser, arranged to monitor molten metal level(s) in the launder. The launder further includes a removeable insert facilitating, reversible modification of a cross-sectional area of the launder.

According to a second embodiment, a molten metal furnace for delivering molten metal to a downstream location is provided. The furnace includes a heating chamber configured to contain and heat a supply of the molten metal and a variable speed pump in fluid communication with the heating chamber. The pump includes a pump inlet connected to the heating chamber and a pump outlet connected to a launder. The launder includes a removeable insert for adjusting a cross-sectional area of the launder. A molten metal level sensor is located in association with the launder and connected to the pump for providing a pump speed control signal. The level sensor is configured to monitor the level of the molten metal in the launder and maintain a preset level of the molten metal in the launder by controlling the speed of the pump with the pump speed control signal.

According to a further embodiment, a process for transporting molten metal from a furnace to at least two different vessels is provided. The process provides a heating chamber configured to contain and heat a supply of the molten metal. The process provides a variable speed pump, the pump having a pump inlet in fluid communication with the heating chamber and a pump outlet in fluid communication with a launder. The launder includes a removeable insert for adjusting a cross-sectional area of the launder. A molten metal level sensor is located in association with the launder and connected to the pump or a controller of the pump for providing a pump speed control signal. The level sensor is configured to monitor the level of the molten metal in the launder upstream of the insert when present, wherein in either order (i) molten metal is transported through the launder to a relatively larger of the vessels without the insert present and (ii) molten metal is transported through the launder to a relatively smaller of the vessels with the insert present.

BRIEF DESCRIPTION OF THE DRAWINGS

The following is a brief description of the drawings, which are presented for the purposes of illustrating the exemplary embodiments disclosed herein and not for the purposes of limiting the same.

FIGS. 1(A-B) illustrate a three mold system of the prior art employing sensors to determine molten metal height in molds;

FIG. 3 schematically illustrates control of metal height in the feed launder by a sensor arrangement.

DETAILED DESCRIPTION

Figure 2:
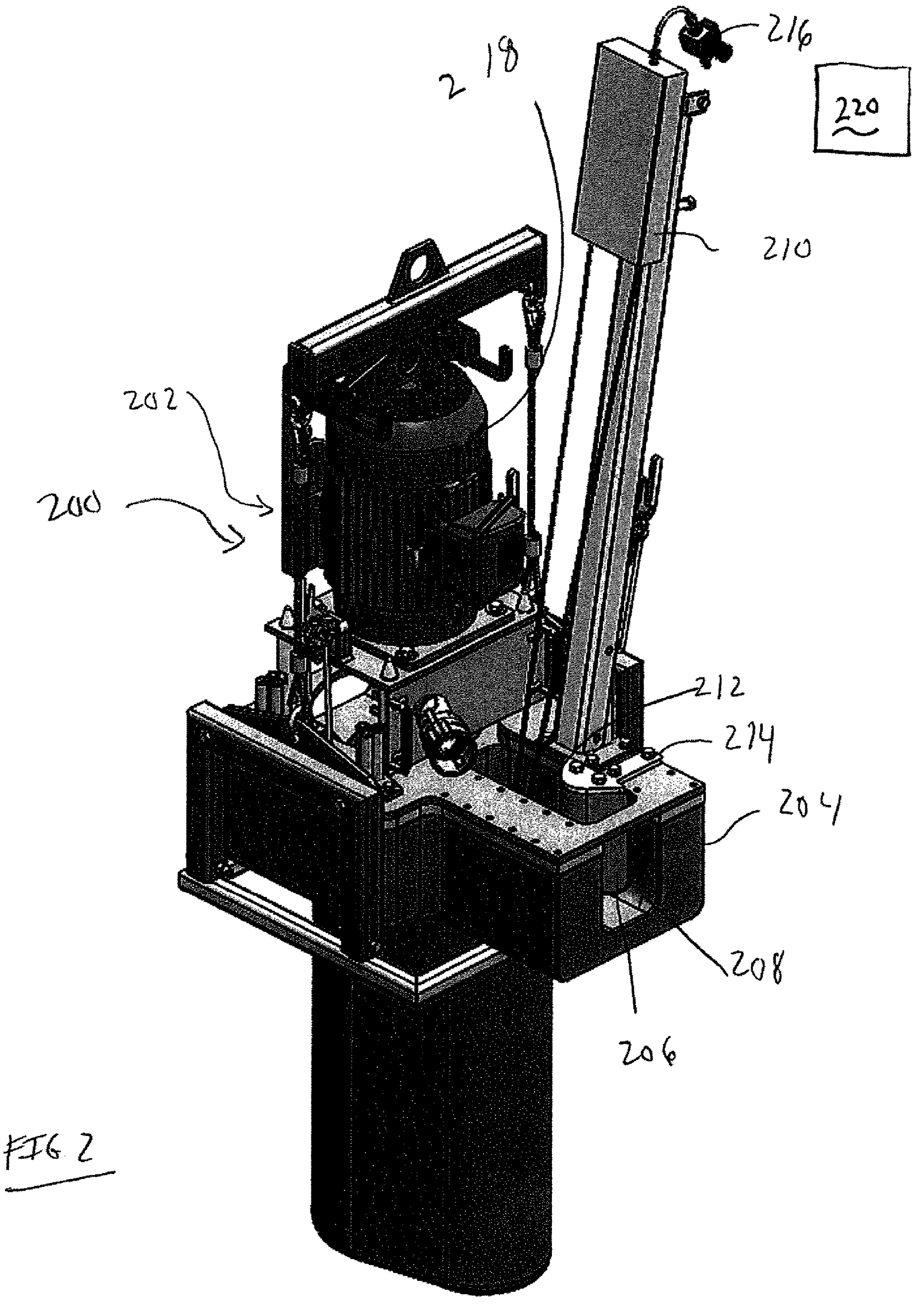
FIG. 2 illustrates an exemplary pumping system in accord with the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms about, generally and substantially are intended to encompass structural or numerical modifications which do not significantly affect the purpose of the element or number modified by such term.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

FIGS. 1A & B illustrate a prior art system employing sensors to determine molten metal height in molds. The system of FIGS. 1A & B is described herein because many features depicted are common to the present disclosed invention.

With continuing reference to FIGS. 1A and 1B, a three mold system is shown (molds 102, 103 and 104). A sensor 100, typically a laser triangulation based sensor is attached to each of the molds 102, 103, 104 and positioned to measure the height of molten metal surface 105 in the molds. Launder 101 delivers molten metal to each mold via down spouts 107, 108 and 109. Controller 115 reads out the data from sensor(s) 100 and using a pin type actuator/stopper(s) 116 controls the flow of metal into the mold(s) 102, 103, and 104.

In the present embodiment, the sensor is employed to monitor the quantity of molten metal in the launder and in combination with a controller, to adjust the pump RPM to stop, increase or decrease the quantity of molten metal delivered to the launder. More particularly, the present disclosure can utilize the sensor(s) and controller to adjust the RPM of an associated pumping system. An important operational parameter is the measured height of metal in launder, which relates to a pour rate.

Laser type electro-optical sensors are effective for monitoring molten metal height. One sensor, or alternatively, multiple sensors can be used for this purpose. However, as discussed above, sensing can be difficult when the level of molten metal in the launder is low due to turbulence and reflections. Accordingly, in a low metal flow condition, the quantity of molten metal delivered from the launder can be more problematic to control.

Moreover, It has been found that a dilemma encountered by systems that use laser sensing of molten metal is that insufficient molten metal can yield inaccurate calculation of metal depth and/or flow rate. It has been found that control of the height of metal in the feeding launder can improve system performance. This height control can be accomplished by providing the launder assembly with a removeable insert, particularly for use when the molten metal level in the launder is anticipated to be low, such as when filling a low volume mold(s). The removeable insert functions to narrow the cross-section of the launder, causing an upstream increase in molten metal depth in the region in which the sensor is directed.

Referring now to FIG. 2, an exemplary pumping system 200 is illustrated. In this embodiment, an overflow transfer pump 202 feeds molten metal to launder 204. Removable insert 206 is provided to reduce the cross-sectional area of the launder flow channel 208. In select embodiments, the insert will reduce the cross-sectional area of the launder flow path by at least 10%, or 25%, or 33%. Laser 210 is aimed into region 212 where molten metal depth is increased via the presence of the insert 206. Two or more sensors spanning different region(s) can be used.

Insert 206 is secured to the launder via a removeable bracket 214. In certain embodiments, it is envisioned that the bracket will be secured to either or both the launder and/or the insert using a quick-release connection such as a pin(s), clamp or interference fit. Insert 206 can be removed during casting operations where a relatively large quantity of molten metal is flowing through the launder, for example, during billet casting (greater than 100 lbs). As a further example, the insert can be removed during and a furnace empty operation where at least substantially the entire volume of molten metal is emptied into a sow. Insert 206 can be inserted into the launder when a relatively low level of molten metal is passing through the launder, such as during small ingot casting (less than 50 lbs). As a further example, a small ingot that is only a few pounds may be formed using a relatively low flow where the insert is employed Sensor 210 can include an information connection link 216 suitable for providing molten metal depth and/or flow rate information to a controller 220 which in turn can control the motor 218 driving the pumping member of pump 202. More particularly, the controller can determine how fast (RPM) the motor should operate to increase or decrease the volume of molten metal passing through the launder based on the requirements of the associated casting operation being performed. Casting efficiency and molten metal quality can be greatly improved in this manner.

In FIG. 3 a profiling laser sensor 304 is placed above the feed launder 301 and used to determine the height of molten metal 310 at multiple transverse locations in the launder with respect to the launder top surface 320 (or other suitable point on the launder). The reference surface, in this case surface 320, can be measured in its position at one point, or at a number of positions using a plurality of spots or along a continuous line of light. In accord with this disclosure, at least one position will be upstream of a removeable insert.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A process for transporting molten metal from a furnace to at least two different vessels, comprising:

providing a heating chamber configured to contain and heat a supply of the molten metal;

providing a variable speed pump, the pump having a pump inlet in fluid communication with the heating chamber and a pump outlet in fluid communication with a launder, said launder including a removable insert for adjusting a cross-sectional area of the launder;

a molten metal level sensor located in association with the launder and connected to the pump or a controller of the pump for providing a pump speed control signal, the level sensor configured to monitor a level of the molten metal in the launder upstream of the insert when present, wherein in either order (i) molten metal is transported through the launder to a relatively larger of the vessels without the insert present and (ii) molten metal is transported through the launder to a relatively smaller of the vessels with the insert present.

2. The process of claim 1 wherein the pump comprises an overflow transfer pump.

3. The process of claim 1 wherein the pump comprises a launder transfer pump.

4. The process of claim 1 wherein the pump comprises a lift pump.

5. The process of claim 1 wherein said vessels comprise ladles.

6. The process of claim 1 wherein said vessels comprise molds.

7. The process of claim 1 wherein the removeable insert includes a bracket having a first end secured to the launder and a second end secured to a body disposed in a flow path defined by the launder.

8. The process of claim 7, wherein at least one of the first end or the second end includes a quick-release connection.

9. The process of claim 7 wherein the body is comprised of a refractory material.

10. The process of claim 7 wherein the body includes a substantially rounded surface.

11. The furnace process of claim 1 wherein the sensor comprises a laser.

12. The furnace process of claim 1 wherein the insert blocks at least 10% of a flow path of the launder.

13. The process of claim 1 wherein at least one of the relatively larger of the vessels and/or the relatively smaller of the vessels is a mold, a ladle or a crucible.

* * * * *